United States Patent [19]

Frogbrook et al.

[11] Patent Number: 4,838,016

[45] Date of Patent: Jun. 13, 1989

[54] BALING MACHINES AND BALED PRODUCTS

[75] Inventors: Kenneth H. L. Frogbrook, Stagwell Dairy Farm, Hillis Gate Road, Northwood, Nr. Cowes, Isle of Wight; Nigel W. Meek, Aylesbury, both of England

[73] Assignee: Kenneth H. L. Frogbrook, Cowes, England

[21] Appl. No.: 21,883

[22] Filed: Mar. 4, 1987

[30] Foreign Application Priority Data

Mar. 4, 1986 [GB] United Kingdom ............... 8605301

[51] Int. Cl.⁴ ............................................. A01D 39/00
[52] U.S. Cl. ........................................... 56/341; 100/5
[58] Field of Search .............. 56/341; 100/5; 53/528, 53/550, 419, 138 R

[56] References Cited

U.S. PATENT DOCUMENTS

| 3,057,129 | 10/1962 | Meissner | 53/550 |
| 3,147,009 | 9/1966 | Gram | 53/550 |
| 3,367,085 | 2/1968 | Parsons | 53/138 R |
| 4,065,914 | 1/1978 | Phillips et al. | 56/341 |
| 4,173,112 | 11/1979 | Meiners | 56/341 |
| 4,205,513 | 6/1980 | Shokoples | 56/341 |
| 4,366,665 | 1/1983 | Van Ginhoven | 56/341 |
| 4,407,113 | 10/1983 | Core | 56/341 |
| 4,409,784 | 10/1983 | VanGinhoven | 56/341 |
| 4,514,969 | 5/1985 | Moosbrucker et al. | 56/341 |
| 4,580,398 | 4/1986 | Bruer et al. | 56/341 |

FOREIGN PATENT DOCUMENTS

| 1757733 | 5/1971 | Denmark. | |
| 3234455 | 3/1984 | Fed. Rep. of Germany | 56/341 |
| 3301420 | 7/1984 | Fed. Rep. of Germany | 56/341 |
| 2383598 | 10/1978 | France. | |
| 2315 | 1/1916 | United Kingdom. | |
| 2128542 | 5/1984 | United Kingdom | 56/341 |
| 2145947 | 5/1985 | United Kingdom | 56/341 |
| 2152872 | 8/1985 | United Kingdom | 56/341 |

Primary Examiner—Paul J. Hirsch
Attorney, Agent, or Firm—Cushman, Darby & Cushman

[57] ABSTRACT

A baling machine adapted to a produce a rolled mat in the form of a bale comprises an inlet (10) for straw or other material to form the mat, a baling chamber (11) for progressively accumulating a rolled bale (41), rollers (12) for forming said straw into an elongate mat, a flow path for mat through the baling machine from the inlet (10) through said rollers (12) to the baling chamber (11), troughs (17, 18) for mounting rolls of net as encasing material adapted to supply the net progressively to the flow path so as at least to over and underly said mat, and a work station in the flow path comprising stapling machine (19) for attaching together over and underlying portions of the encasing material through said mat.

23 Claims, 4 Drawing Sheets

BALING MACHINES AND BALED PRODUCTS

FIELD OF THE INVENTION

The present invention relates to baling machines and to baled products and it has particular relevance to the production of rolled bales of encased mats of materials such as straw, useful in a variety of fields of application including treating oil spillages.

BACKGROUND OF THE INVENTION

Oil spillages constitute a severe pollution threat. Much effort has been devoted to developing methods capable of collecting oil spilt into water or otherwise neutralising the threat posed by such spilled oil. The use of detergents to disperse spilt oil is unsatisfactory in that the detergents themselves are an environmental hazard and the oil frequently reappears after it has apparently been dispersed. Oil containment booms have been proposed to prevent the spreading or drifting of spilt oil whilst collection of the oil can be carried out. Such booms however are too expensive to be used to contain very large spillages.

Numerous methods of collecting spilt oil have been proposed. Some employ collection media which absorb oil and are disposed of once the oil has been absorbed. Some employ a collection medium from which the oil may be removed so that the collection medium may be reused.

It is known that certain plant materials and in particular straw are capable of collecting oil. Attempts have been made in the past to collect oil from water by floating bales of straw in the water. Use of individual bales in this manner is however impractical on a large scale in view of difficulties of handling the individual bales and in view of the tendency of the bales to break up once in the water so that the oil saturated straw cannot itself be collected easily.

I have now developed a product employing plant material such as straw for its oil collecting properties which avoids the disadvantages described above. The present invention is however applicable not only to plant material packaged for use in collecting oil but also to the packaging of plant material for storage and for use in many other situations and is applicable also to the handling of plant material not suitable for collecting oil eg. for use as fodder.

British Patent Specification No. 1352741 describes a mat of cellulose fibres treated to be water repellant, encased in wire netting and rolled up for storage ready for use in absorbing oil as a contaminant on land or water. It condemns the previously known use of loose straw as an absorbent as being largely ineffective.

U.S. Pat. No. 3,617,566 describes the use of straw as a carrier for atactic polypropylene to be encased in a net bag to absorb oil and refers to previous use of loose straw as an absorbent as being ineffective.

It has also been proposed elsewhere to encase other plant derived materials (e.g. bark in British Patent Specification No. 1210690) in net for oil absorbing.

Such methods have not been found sufficiently effective or economical to gain wide acceptance. With regard to U.S. Pat. No. 3,617,566, straw is light and voluminous making it expensive to transport for treatment. No machinery is described for packing the straw efficiently into net bags. Methods and apparatus are wanted for encasing straw or like plant stem materials which can be used in proximity to where the straw is grown or even in the very field in which it is grown so as to reduce transport costs. Furthermore, if straw is simply encased in net bags, the straw will tend to clump unevenly in the net bags encasing it when these are deployed for oil absorption on land or on water.

I have found that plant stem material such as straw in the form of a mat encased in a water permeable encasing material such as net is a very useful absorbent for oil in many situations including for floating at sea and for pegging out on the shore to catch oil as it washes ashore. I have found further found that by attaching opposed layers of the encasing material through the mat the clumping of the straw in use is substantially prevented, thus enhancing the utility of the product.

SUMMARY OF THE PRESENT INVENTION

Accordingly, there is herein described an elongate mat of plant stem material, preferably straw, encased in a cover of, for instance, netting through which oil may pass to be absorbed by the straw.

Products of this nature have been found to be effective in dealing with oil spillages in water. The encased mat may be unwound from the bale and may be floated in the water to absorb the oil. Subsequently, one may dispose of the contaminated mat by burning. These mats may also be used as containment booms and they may be pegged out on mud flats or beaches to protect them from oil washing ashore.

A flat mat of straw encased in netting unrolled from a large circular bale in this way will float in sea water and will float low in the water as does crude oil. Accordingly, it will not be greatly affected by waves and wind but will drift at a rate similar to that of the oil. The collecting medium described above has a high affinity for crude oil in water and, e.g. an oil spillage at sea, and will absorb up to fifteen times its own weight of oil.

The collecting medium does not lose its structural integrity due to the presence of the encasing cover and may be removed from the water for subsequent treatment. However, a particularly advantageous feature of the product described above is that it may be burnt in water. In the example described above the straw acts as a wick to allow the complete burning of crude oil whilst the mat of collecting medium is floating at sea.

If the collecting medium is retreived from the oil/water mixture, it may be used as fuel and may be treated to produce a more convenient form of product for use as fuel. For instance it may be compressed to form fuel bricquettes.

A preferred method of collecting hydrocarbons to protect beaches using the product described above is to fix lengths of the encased plant material along beaches to be protected. Waves containing oil breaking over the encased material covering the beach surface deposit their oil on the encased material which prevents it penetrating to the beach beneath. The material may then easily be collected and disposed of when the spillage is over.

Large circular bales consisting of a rolled strip of plant material are widely used in farming. The type of plant material involved varies and includes all kinds of crops. In particular, feed crops and silage are conventionally baled in this way. Bales are conventionally bound with twine and may thereafter be bagged in plastic sacks. Once this outer packaging is removed, the bale will disintegrate and it will become very difficult to handle.

Bales of rolled plant material product comprising a roll of a strip or mat of plant material, which strip is encased in a supporting sleeve as described herein, may be unwound gradually as required and the supporting sleeve stripped from the plane material to enable it to be used as desired, e.g. for feed purposes.

Whilst encased mats of the kind described can be produced manually this is a time consuming process.

Baling machines are known which produce "big round bales" of plant material such as straw and in some of these known baling machines the structure of the bale produced is that of a rolled mat. Baling machines of this kind operate by picking up straw from a window, passing it between rollers to form it into a mat and accumulating the mat as an expanding rolling bale in a baling chamber where the mat is bounded by flexible belts which serve to constrain the bale as it accumulates whilst permitting it to expand.

Whilst such known baling machines do provide a bale in the form of a rolled mat, and may be provided with means for encasing the whole bale in a protective material, they do not of course serve to encase the mat before it is rolled into the bale.

The present invention now provides a baling machine for producing a rolled mat in the form of a bale which baling machine comprises means defining an inlet for receiving material to form the mat, means for forming an elongate mat from material received at said inlet, a baling chamber for progressively accumulating a rolled bale of said mat, means defining a flow path for said material through the baling machine from the inlet through said forming means to the baling chamber, means for mounting a supply of encasing material adapted to supply encasing material progressively to the flow path so as at least to over and underly a mat formed by said mat forming means, and means for guiding encasing material from said supply in use to said flow path to over and underly a mat formed by said mat forming means.

If the encasing material is supplied as upper and lower separate strips of encasing material, means are provides at a work station in the flow path, for attaching together over and underlying portions of the encasing material through said mat intermediate at the edges thereof.

Thus, preferably, said means for mounting a supply of encasing material comprises first means for mounting a first supply of said material and second means for mounting a second supply of said material, and means are provided for guiding material from the first and second supplies simultaneously to over and underly said mat respectively, said machine further comprising, at a workstation in the flow path, means for attaching over and underlying portions of the encasing material along the mat edges.

The means for mounting supplies of encasing material may each be adapted to mount a roll of encasing material to be unwound progressively to supply said material.

In such an arrangement therefore, it will generally be the case that the mat will be formed so that its transverse dimension is horizontal and encasing material from the first supply will be laid on top of the mat whilst encasing material from the second supply is conducted to underly the mat.

Preferably, the arrangement is such that in use the encasing material is supplied to the forming means so that the mat is then formed and encased in a single step.

The means for forming the material into a mat may comprise a pair of nip forming members such as a pair of endless belts having opposed runs moving in the same direction or a pair of counter-rotating nip rollers between which the material is directed.

Where there are first and second supplies of encasing material, means may be provided for guiding the encased material from the first and second supplies to feed to enter the nip of such nip rollers or belts along converging first and second runs and to pass through the nip. Means may be provided also for guiding the mat forming material to enter the nip between the first and second encasing material runs.

As an alternative to the use of separate first and second supplies of encasing material, the means for mounting a supply of encasing material may be adapted to mount a collar of said material in the form of an axially shirred tube thereof so positioned that the mat forming material is introduced into said collar to be encased by said encasing material either before or after the formation of the mat.

Preferably however, the means for mounting such a collar is so positioned that in use the mat forming material passes into said collar upstream of said forming means.

Where this method is used, the attaching of opposed layers of encasing material through the mat may be omitted if it is not important to prevent clumping of the plane material, e.g. when the bale is to be used for fodder.

Where there are separate first and second supplies of encasing material, means may be provided for guiding edge portions of the encasing material from the first or second supply to extend around the longitudinally running edges of the mat to over or underly edge portions of the encasing material from the other of said supplies. By such an arrangement, the encasing material is wrapped around the longitudinal edges of the mat to provide a neater appearance and better containment. However, it is within the scope of the invention to have the encasing material both above and below the mat extending beyond the sides of the mat and to attach the layers of encasing material together in this extending region.

The encasing material is preferably a net. In order that the unwound encased mat can in use be towed either in water or over the ground, the arrangement is preferably such as to provide the encased mat with a substantial longitudinal strength. This may be achieved by using a net having substantial tensile strength, for instance at least 500 kg, preferably of more than 750 kg, more preferably of more than 1,000 kg and most preferably over 1,500 kg.

As an alternative to providing an encasing material having uniformly the high tensile strength described above, strengthening members may be included running longitudinally through or over the encased material. These may include longitudinally extending belts, cords, ropes or strings running through the encased material itself.

More preferably however, the encasing material comprises longitudinally running bands of relatively close structured material.

These may serve two purposes. First, they may represent areas of increased strength. Secondly, they may be used to assist in the fastening or attaching of the over and underlying portions of the encasing material together e.g. by providing areas in which fastening elements may find purchase. The longitudinally running bands may be separate from the encasing material and may be applied to the surface of the encasing material, preferably that which lies more remote from the mat in the encased mat, and they may be applied either before the encasing material is applied to the mat or after the mat has been encased. Preferably they are applied on both major surfaces of the mat. They may be of, for instance heavy paper, cloth, close structured netting strip, plastics, or even of woven metal.

Alternatively however the bands may be integral in the encasing material. For instance, where the encasing material is a net, the bands may be zones of finer net or of still closer construction such as closely woven areas or sheet areas. Where the net is of a woven or knotted construction, the bands may be formed as more closely woven or knotted longitudinally extending zones or selvedges.

Where the supply of encasing material comprises a pair of rolls of strip form material, the bands may be provided along longitudinally running edge zones of one or both of the encasing material strips. They may be provided additionally or instead along at least one longitudinally running interior zone of one or both of the encasing material strips.

Preferably the attaching of the encasing material together is conducted so that the attaching takes place within said bands.

Means may be provided to squash the mat in the longitudinally running zones within which attaching together is to take place and such means is preferably positioned immediately before the work station in which the attaching occurs.

The attaching together of the layers of encasing material may be by any suitable means such as stitching, stapling, pinning, welding, fastening by adhesive, ultrasonic welding, or by applying interconnecting fastening means to the portions of encasing material to be fastened and interconnecting the same.

Stapling is particularly preferred for most end uses of the bales. For fodder use, the use of fasteners is preferably avoided and stitching is preferred. For this end use, it will generally not be necessary to attach the encasing material layers together other than at the bale edges since the problem of clumping of the plane material in the bale is not likely to arise.

The baling machine may comprise means for supplying at least one continuous fastener strip to said work station to overly a face of the encased mat which strip comprises a linked series of fastener elements, and means may be provided for driving said fastener elements through the mat to engage the encasing material on the opposed side of the mat.

Such a continuous fastener strip may for instance be a plastics strip bearing spiked members protruding from a face of the strip and the spiked members may engage simply in the encasing material on the opposite face of the mat or, more preferably, a retaining second strip may be supplied to the opposite face of the mat in which the spiked members are designed to locate. Preferably, the arrangement is such that each spiked member can locate at any position within the said retaining strip.

Preferably, the fastener means in the work station is positioned to be applied to the encased mat to fasten said over and underlying encasing material portions along the sides of the mat and also along at least one longitudinally running interior zone.

The baling machine preferably includes a power operated gate for the ejection of bales from the baling chamber. The baling machine preferably also includes a power operated guillotine for severing the encased mat or for severing unfilled encasing material at the end of a section of mat upstream of the baling chamber.

Preferably the operation of the gate and guillotine are linked whereby they operate in synchrony or such that the gate operates a predetermined interval after the guillotine.

The baling machine may be a stationary machine to which material, such as straw to be baled, is conducted by other means.

However, the baler is preferably mobile and will then generally be provided with ground engaging wheels or tracks.

It preferably includes crop pick up means adapted to pick up a crop, e.g. cut straw, and to feed the crop to the inlet.

Preferably there are control means to stop crop pick up a predetermined interval before guillotine operation. This will normally have the result that an unfilled portion of encasing material is in the guillotine zone of operation when the guillotine is actuated, thus lessening the chances of mat forming material escaping from the end of the encased mat.

The invention includes in a second aspect an adaptor unit for a baling machine to enable the baling machine to produce a rolled encased mat in the form of a bale, which adaptor comprises an inlet for material to form the mat, means for forming the material into a mat, and means defining an outlet for mating with an inlet to a suitable baling machine, a flow path for the material from the inlet, via the forming means to the outlet, means for mounting a supply of encasing material adapted to supply encasing material progressively to the flow path so as to at least over and underly said mat, and preferably a work station in the flow path comprising means for attaching together over and underlying portions of the encasing material.

Such an adaptor unit preferably therefore provides a "bolt on" attachment for baling machines, themselves designed merely to accumulate a rolled bale of unencased mat, to transform the existing baling machine into a baling machine according to the invention as described above.

The adaptor unit preferably is such as to confer on the converted baling machine all or any of the preferred features of baling machines according to the invention described above.

In a third aspect, the invention provides an encased mat of material, such as plant stem material, wherein the encasing material is a net provided with longitudinally extending strips of relatively close structure material through which strips over and underlying portions of the encasing material are fastened together through the mat.

As described above, the strips may be integral with the netting material or may be overlaid onto the netting material.

The invention includes a method of constructing encased mats using a baling machine of the kind described above.

In a further aspect, the invention includes a mat encasing machine adapted to produce an encased mat which comprises an inlet for material to form the mat and an outlet for encased mat, means for forming said material into an elongate mat, a flow path for sid material through the machine from the inlet to the outlet through the said forming means, means for mounting a supply of encasing material adapted to supply encasing material progressively to the flow path so as to at least over and underly said mat and preferably a work station in the flow path comprising means for attaching together over and underlying portions of the encasing material through said mat. Encased mat produced by such a machine may be rolled up in a separate step to produce bales. This may be done by feeding the encased mat to a conventional baling machine of the kind described herein, the feeding suitably being carried out by moving the baling machine along a laid out mat to pick it up.

The invention includes bales comprising a roll of an encased mat of plant stem material and methods of producing such bales using baling machines.

BRIEF DESCRIPTION OF THE DRAWINGS

The invention will be illustrated by the following description of a preferred embodiment of a baling machine according to the invention and embodiments of encased mat products produced according to the invention with reference to the accompanying drawings in which.

DETAILED DESCRIPTION OF PREFERRED EMBODIMENTS

Figure 1:
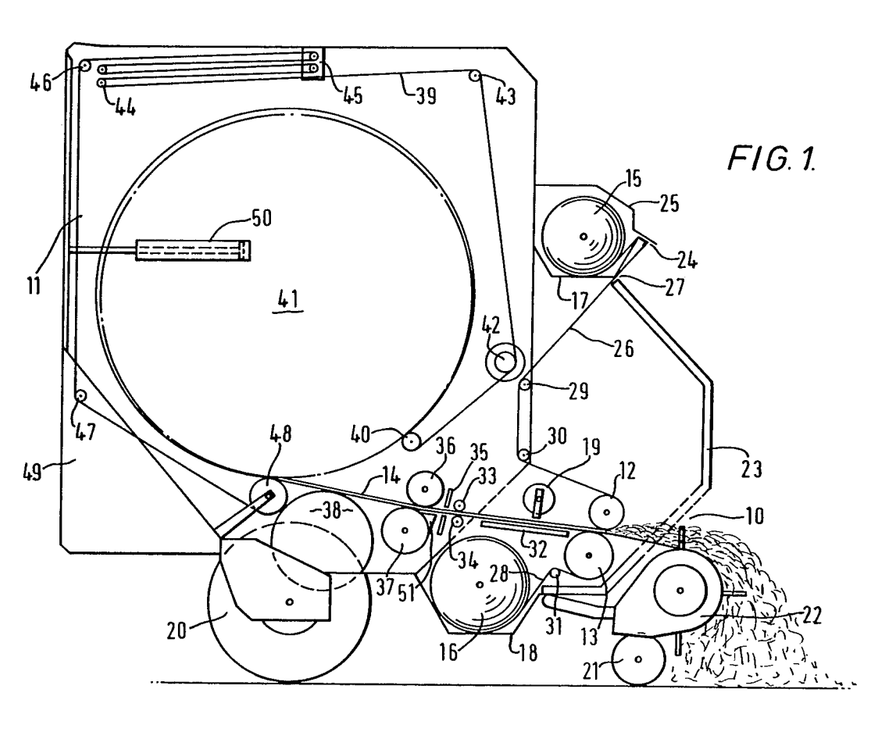
FIG. 1 is a schematic cut away side elevation of a baling machine according to the invention.

As shown in FIG. 1, a baling machine comprises an inlet 10 for straw to be baled, a baling chamber 11 for progressively accumulating a rolled bale, a pair of opposed nip forming rollers 12 and 13 for forming the straw into a mat 14, an upper roll of encasing net strip 15 and a lower roll of encasing net strip 16 mounted in respective roll containing troughs 17 and 18 and a work station comprising a set of stapling guns 19 positioned to staple through the mat 14.

In more detail, the baling machine illustrated is a mobile baling machine adapted to be towed to pick up straw from a window and form it into an encased, baled mat. The baling machine is provided with ground engaging wheels 20, 21 and with a conventional form of pick up roller 22 for picking up straw or other crop. The baling machine has a front housing portion 23 having window constituting the inlet 10 for the crop into the interior of the baling machine. At the upper end of the front housing portion 23 there is provided the roll receiving trough 17 in which in use lies a roll 15 of net strip. An outlet slot 24 is provided between the front upper edge of the trough 17 and a removable cover 25 and a first run of net strip 26 is conducted through the slot 24 and into the interior of the baling machine through a second slot 27 in an upper portion of the casing 23.

At the lower end of the casing portion 23 there is provided the lower roll receiving trough 18 containing a second roll 16 of net strip from which a second run of net material 28 is conducted upwardly into the interior of the front part of the baling machine.

Nip rollers 12 and 13 are positioned inside the casing portion 23 immediately behind the inlet 10 so that straw picked by the pick up roller 22 will be directed into the nip between the rollers 12 and 13. The first run of net material 26 is conducted over guide rollers 29 and 30 and hence over roller 12 to enter the nip over the straw. The second run 28 of net material is conducted over a guide roller 31 and hence over roller 13 to enter the nip below the straw. The mat of straw formed by the nip rollers is thereby simultaneously encased in an upper and a lower run of net strip material.

From the rollers 12, 13, the encased mat passes to a work station containing the stapling guns 19 and a support table 32. There are four stapling guns extending in a transversely running row so that only one is visible in the view shown. Each is applied above the mat against the work table 32 to apply rows of staples to the mat as it passes through the work station. Stapling guns for stapling materials conveyed thereunder in the manner described above are well known in general and the ordinary artisan will readily appreciate upon a review of this disclosure which such known stapling guns could be employed for stapling the encased mat of the present invention and the manner in which they could be mounted within the device.

The operation of the stapling guns may be controlled in response to measurement of the rotation of the nip rollers or passage of net from the supply so as to ensure even spacing of the fasteners along the mat. The manner in which the stapling guns can be controlled is also well known in the fastening art and, in particular, in the stapling art and, therefore, the ordinary artisan will readily appreciate the manner in which the above control can be effected.

From the work station, the mat progresses to the nip of a pair of push rollers 33, 34.

Immediately downstream of the push rollers is positioned a power operated guillotine 35 positioned to cut thorough the mat when required.

A guide surface 51 is provided immediately upstream of the guillotine to assist after guillotine operation in guiding the netting material into the nip of the rollers 36, 37 next to be described.

Further opposed rollers 36, 37 feed the mat into the baling chamber 11 and onto a larger ribbed roller 38 which causes the bale accumulating in the baling chamber to roll so taking up the mat as it feeds into the baling chamber.

The baling chamber contains an assembly of parallel bale restraining belts 39. Each belt 39 is endless and passes around a course comprising a first roller 40 abutting the surface of an accumulating bale 41 in the baling chamber, a roller 42 in the forward part of the baling chamber, a guide roller 43 at the top forward corner of the baling chamber, a set of fixed rollers 44 and a set of rollers 45 movable front to back in the baling chamber as a unit so forming with the rollers 44 a festoon for accumulating a variable length of belt. The belt then passes further along said courses to a fixed roller 46 in the rear top corner of the baling machine, down to a fixed roller 47 along the rear of the baling chamber, thence to a fixed roller 48 adjacent the large roller 28 and immediately underlying the accumulating bale 41 and finally around the accumulating bale back to the roller 40. It can be seen that the belts 39 enclose a bale 41 as it accumulates in the chamber in such a way that the bale is free to expand in a restrained manner, the belt being taken out of the festoon formed by the rollers 44 and 45 to accumulate the expansion.

Finally, the rear wall of the baler is formed as an exit gate 49 which pivots about the top rear corner of the baler and carried with it the roller 48 so that a bale 41 accumulated in the chamber is free to drop rearwardly out of the baling machine expelled by the tension in the belts 39.

There will be generally approximately five to ten belts 39 following parallel runs around the rollers described.

The rear access door is actuated to open by a pair of hydraulic rams 50 positioned on on either side of the baling machine. Preferably, control means is provided to synchronise the operation of the rams 50 with the operation of the guillotine 35.

In use therefore, straw or other plant material is picked up by the pick up roller 22 and conducted in through the inlet 10 to the nip between rollers 12 and 13 where itis formed into a mat and simultaneously receives an upper and a lower covering of net material. The encased mat of straw passes through the work station where the upper and lower netting strips are stapled together by the stapling guns 19 along parallel longitudinally extending zones. Generally, it will be desirable to stop the operation of the pick up roller shortly before a bale is completed so that an empty stretch of netting comes to the guillotine 35. The guillotine 35 is then actuated to cut the netting and the bale 41 is expelled through the gate 49. When the pick up roller is re-started, the push rolls 33 push the netting material up guide surface 51 into the nip of the rollers 36, 37 to recommence passage of material into the baling chamber.

Naturally, there will in addition to the components illustrated be suitable means provided for driving the various rollers described and for accommodating movement apart of the rollers where necessary to accommodate variations in the thickness of the mat. These however may be of a conventional nature.

A conventional round baler is available (under the Trade Mark GEHL) which closely resembles the rear portion of the baling machine illustrated. Thus, in the conventional machine, the front housing portion 23 and the roll receiving troughs 17 and 18 are omitted and a pick up roller and ground engaging wheel are positioned in the conventional machine in approximately the same position as the netting roll 16 illustrated. The crop picked up therefore feeds directly into the equivalent of the rollers 36, 37 and into the baling chamber. It can be seen therefore that there has been described with reference to the right hand part of FIG. 1 in effect an adaptor unit for fitting to a baler of this kind to convert it for simultaneous baling and encasing.

Figure 2:
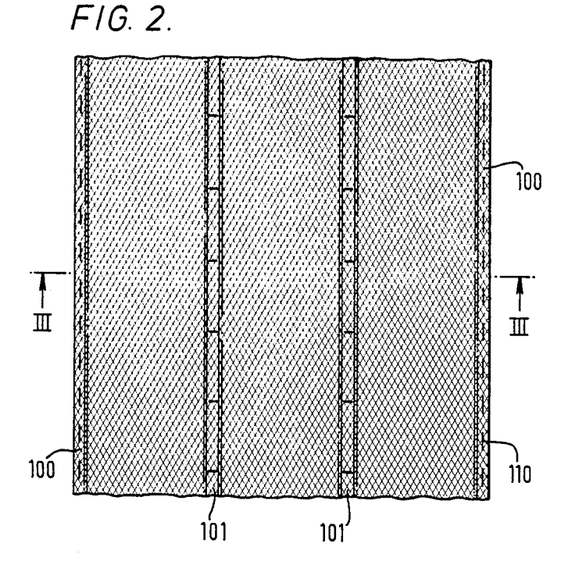
FIG. 2 is a plan view of a mat according to the invention.
Figure 3:
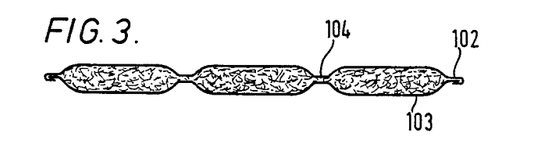
FIG. 3 is a cross-section on the line III—III in FIG. 2.
Figure 4:
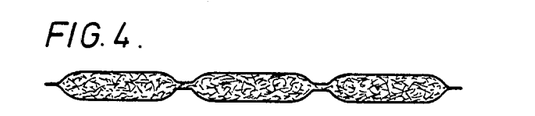
FIG. 4 is a similar cross-section through an alternative mat construction.

Turning to FIGS. 2 to 4, FIG. 2 shows in plan view a mat according to the invention. The mat illustrated comprises an upper and a lower layer of netting, for instance of high tensile strength nylon netting. One suitable form of netting for this purpose is so-called monofilament netting which consists of a net of thicker filaments criss-crossed by an essentially random network of thinner mono-filaments producing an overall netting structure of surprisingly high strength.

Along each longitudinally running side 100 of the netting strips above and below the mat and along two inwardly lying longitudinally extending bands 101 the netting is formed with a relatively close structure. Suitably, the longitudinally extending bands of the close structure netting are separated by up to 900 mm, preferably about 400 mm.

As can be seen in FIG. 3, the upper layer 102 of netting is carried around the edge of the mat to underly the lower surface of the lower layer 103 of netting. The longitudinally extending zones 104 of the mat between the over and underlying relatively close structure portions of the netting 100, 101 are flattened and fasteners in the form of staples 110 have been passed through the relevant close structured bands of netting to join the upper and lower netting strips. Suitably, the staples are placed at 15 to 30 cm centres.

As illustrated in FIG. 2, the rows of staples 110 on the sides of the mat have been placed so that each staple extends in the longitudinal direction of the mat whilst those in the central bands 101 have been placed so that the staples extend transversely of the band.

In the modification shown in FIG. 4, the structure of the mat is the same as in FIGS. 2 and 3 except that at the extreme edges the upper and lower netting strips extend laterally beyond the mass of straw constituting the mat and are fastened one over the other without being turned over the edge of the mat as in FIG. 3.

Figure 6:
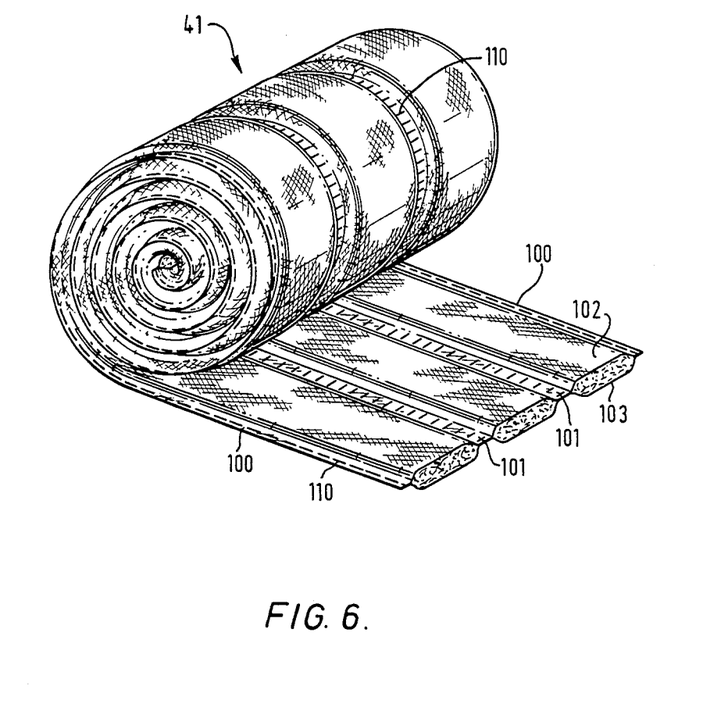
FIG. 6 is a schematic view of a bale produced by the machine of FIG. 1, partially unwound.

The mats as made in the baling machine described above are rolled as shown schematically in FIG. 6 to form large round bales.

Bales of this type may conveniently be made in sizes up to 500 kilograms. Generally, they will preferably be in the weight range of 300 to 450 kilograms.

Bales of this kind can conveniently be made in widths of about 1.5 meters and lengths such as to give a bale diameter of upto about 1.5 meters.

The size of the bale is however a matter of convenience only.

Many modifications and variations of the invention as specifically described may be made within the scope of the invention.

In particular, instead of the bands of close construction material being integral with the respective strips of netting as in FIGS. 2 to 4, they may be tapes or other strips laid over the surface of the netting encasing the mat either before or after the encasing step.

The baler shown in FIG. 1 may incorporate suitable guide means for producing the rolled edge effect illustrated in FIG. 3.

The baling machine may be a stationary machine not necessarily equipped with a pick up roller or ground engaging wheels as illustrated in FIG. 1 but requiring a feed to the machine of material to be formed into a mat.

Instead of the baling machine being provided with troughs for locating two separate rolls of net strip material as illustrated in FIG. 1, the baling machine may be provided with means for mounting a collar of shirred tubular net material between the pick up roller 22 and the rollers 12, 13. In such an arrangement, the crop which is to form the mat passes into the bore of the tubular netting collar and the tubular netting is progressively pulled from the shirred store thereof with the mat material into the nip of the rollers 12, 13. Alternatively, the collar of the encasing net material may be positioned after the rollers 12, 13 and before the works station.

Figure 5:
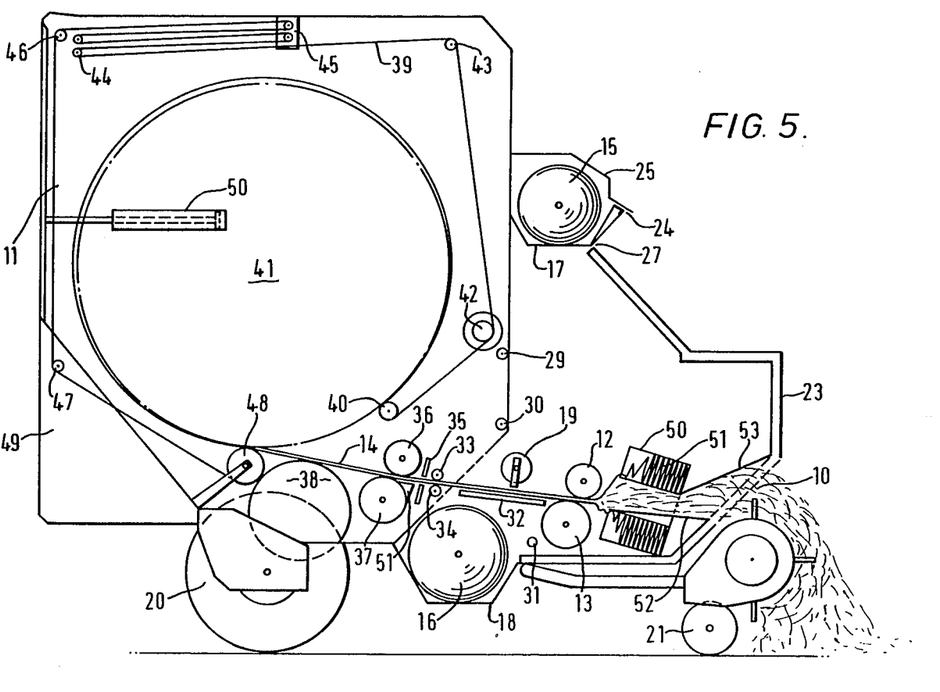
FIG. 5 is a schematic cut away side elevation of a second embodiment of a baling machine according to the invention.

Thus, as a further modification, FIG. 5 shows a baling machine similar to that of FIG. 1 except as follows.

The front part of the machine is extended to accommodate an oval annular hopper 50 having its long axis extending across the baling machine in which is disposed a shirred collar of tubular net 51, one end of which is led out of the hopper to enter the nip of rollers 12, 13. A guide plate 52 serves as a floor to support straw moving from the inlet to the nip of the rollers and a second guide plate 53 serves as an upper guide for the straw to assist it in entering the central aperture of the hopper 50.

This provides for the use of an alternative form of supply of encasing material in the form of a tube.

A preferred net for encasing straw mat in accordance with the invention is a knotless nylon net in which joins are made by welding, e.g. ultrasonic welding, of the kind exemplified by Knox 30 S knotless nylon 25 mm square 1.25 mm diameter cord, having a tensile strength of 1700 kgs ad a high strength against puncturing.

We claim:

1. A baling machine for producing a mat encased in an apertured material and for rolling the encased mat in the form of a bale, said baling machine comprising, in combination:

a housing;
   means defining an inlet in said housing for receiving material for a mat;
   a baling chamber defined within said housing for progressively accumulating a rolled bale of encased mat;
   means defining a conveyance path between said inlet means and said baling chamber;
   means defined along said conveyance path for forming material received through said inlet means into a continuous, elongated mat of said material;
   means for mounting a supply of apertured encasing material to said housing; and
   means for guiding said apertured encasing material from said mounting means to said conveyance path so that said apertured encasing material is received at said conveyance path both under mat material being conveyed along said conveyance path and on top of said mat material so as to define a mat material encased with said apertured encasing material;
   whereby material received through said inlet is progressively encased on top and bottom surfaces with an apertured encasing material and formed into an elongated mat and the encased mat is rolled into a rolled bale within the baling chamber and whereby said bale can be unrolled so as to define an elongated encased mat.

2. A baling machine as claimed in claim 1, wherein said means for mounting a supply of apertured encasing material comprises a first means for mounting a first supply of apertured encasing material disposed vertically above said conveyance path and a second means for mounting a second supply of apertured encasing material disposed vertically below said conveyance path and wherein said means for guiding material from said means for mounting to said conveyance path include means for guiding a first portion of encasing material from said first supply to an upper surface of mat material being conveyed along said conveyance path and means for guiding a second portion of encasing material from the second supply to a point below said mat material, said baling machine further comprising means for fastening said first and second portions of encasing material together along at least the longitudinal side edges thereof so as to completely encase said mat material between said first and second portions.

3. A baling machine as claimed in claim 2, wherein said first and second means for mounting a supply of encasing material include means for mounting a roll of encasing material, said roll of encasing material being progressively unwound as material is supplied to said mat material being conveyed along said conveyance path.

4. A machine as claimed in claim 2 further comprising means for guiding edge portions of the encasing material from the first or second supply to extend around the longitudinally running edges of the mat to overlap edge portions of the encasing material from the other of said supplies.

5. A baling machine as claimed in claim 1, further comprising means defined along said conveyance path for coupling the over and underlying encasing material portions at a point intermediate the longitudinal edges of the mat material being conveyed along the conveyance path.

6. A machine as claimed in claim 5, further comprising means to squash the mat in longitudinally running zones, said means for attaching over and underlying portions of the encasing material being located so as to operate in said zones.

7. A machine as claimed in claim 5, wherein said attaching means comprises a plurality of stapling machines.

8. A baling machine as claimed in claim 5, wherein said attaching means are disposed so as to fasten said over and underlying encasing material along the longitudinal side edges of the encased mat and along a longitudinally extending portion of said encased mat.

9. A baling machine as claimed in claim 1, wherein said means for forming the material into a mat comprises first and second members defining therebetween a nip gap, said material for forming said mat being fed between said members so as to be compacted therebetween to define an enlonged mat.

10. A baling machine as claimed in claim 9, wherein said means for mounting includes first and second means for mounting first and second supplies of apertured encasing material and wherein said means for guiding the encasing material includes means for guiding material from the first supply to a point upstream of said pair of members defining a nip and means for guiding material from said second supply to a point upstream of said pair of members defining a nip whereby said first and second supplies converge and pass through the nip on either side of the material passing through the nip.

11. A machine as claimed in claim 10, further comprising means for guiding material for forming said mat to enter the nip between said first and second encasing material runs.

12. A machine is claimed in claim 1 further comprising a power operated gate for the ejection of bales from the baling chamber.

13. A machine as claimed in claim 1 further comprising a power operated guillotine in the flow path upstream of the baling chamber for severing at least the encasing material at the end of a section of mat.

14. A machine as claimed in claim 13, further comprising a power operated gate for the ejection of bales from the baling chamber and control means linking operation of the gate and guillotine whereby operation of the guillotine is constituted to occur not earlier than an associated operation of the guillotine.

15. A machine as claimed in claim 1, further comprising ground engaging members by which the machine is mobile and crop pick up means adapted to pick up a crop and to feed the crop to the inlet.

16. A machine as claimed in claim 15, further comprising a power operated guillotine in the flow path upstream of the baling chamber for severing at least the encasing material at the end of a section of mat and control means adapted control said pick up means to stop crop pick up a predetermined interval before guillotine operation.

17. A machine as claimed in claim 1, in combination with a supply of apertured mat encasing material.

18. A machine as claimed in claim 17, wherein said material is a net material.

19. A machine as claimed in claim 17, wherein strengthening members are included in the said net in the form of longitudinally running bands of relatively close structured material.

20. An adaptor unit for a baling machine for converting the baling machine to operate as a baling machine for producing a mat encased in an apertured material and for rolling the encased mat in the form of a bale, said adaptor comprising:

a housing;

means defining an inlet in said housing for material for forming a mat;

means defining an outlet in said housing;

means for mounting said housing to a baling machine so that said outlet is disposed adjacent an inlet of the baling machine;

a conveyance path defined between said inlet of said housing and said outlet;

means defined along said conveyance path for forming the mat material into an elongated mat-like configuration;

means for mounting a supply of apertured encasing material; and guide means for guiding apertured encasing material from said mounting means to said conveyance path at least above and immediately below said mat material;

whereby material for forming said mat received in said inlet is formed into a mat and encased within said apertured material and an encased mat formed thereby is conveyed from the outlet of the adapter.

21. A method for producing an encased mat of plant material and for forming said encased mat into a rolled bale of encased mat comprising:

introducing plant material into an inlet of a baling machine;

forming said plant material into an elongated mat;

guiding apertured encasing material from a supply of apertured encasing material to the upper and lower surfaces of said plant material;

attaching the over and underlying materials to one another so as to encase said mat material in said apertured encasing material;

accumulating the encased mat into a progressively enlarging bale in a baling chamber of the baling machine; and severing the encased mat so as to define a separate, accumulated bale.

22. A method as claimed in claim 21 wherein said step of guiding material comprises guiding material from first and second rolls of apertured encasing material along upper and lower converging paths, said plant material being fed between said paths so as to define an encased mat of plant material.

23. A method as claimed in claim 22 wherein said step of guiding comprises guiding a net material.

* * * * *